US011231360B2

(12) United States Patent
Kenowski

(10) Patent No.: US 11,231,360 B2
(45) Date of Patent: Jan. 25, 2022

(54) AUTOMATIC TITRATION DEVICE

(71) Applicant: Hydrite Chemical Co., Brookfield, WI (US)

(72) Inventor: Andy Kenowski, Waukesha, WI (US)

(73) Assignee: HYDRITE CHEMICAL CO., Brookfield, WI (US)

( * ) Notice: Subject to any disclaimer, the term of this patent is extended or adjusted under 35 U.S.C. 154(b) by 235 days.

(21) Appl. No.: 15/637,625

(22) Filed: Jun. 29, 2017

(65) Prior Publication Data

US 2019/0003961 A1 Jan. 3, 2019

(51) Int. Cl.
*G01N 21/25* (2006.01)
*G01N 31/16* (2006.01)
*G01N 1/28* (2006.01)
*G01N 1/02* (2006.01)
*G02B 27/02* (2006.01)
*G01N 21/79* (2006.01)

(52) U.S. Cl.
CPC ............. *G01N 21/253* (2013.01); *G01N 1/02* (2013.01); *G01N 1/2806* (2013.01); *G01N 21/79* (2013.01); *G01N 31/16* (2013.01); *G02B 27/02* (2013.01)

(58) Field of Classification Search
CPC .......... G01N 21/25; G01N 31/16; G01N 1/28; G01N 1/02
USPC ...................................................... 436/163
See application file for complete search history.

(56) References Cited

U.S. PATENT DOCUMENTS 2,248,765 A * 7/1941 Langelier ........... G01N 33/1813
436/164
2,621,671 A * 12/1952 Eckfeldt ............. G01N 31/166
205/788.5
2,726,936 A * 12/1955 Bernheim ............... G01N 21/79
422/77
2,757,132 A * 7/1956 Northrop ................ G01N 31/16
205/779.5
2,897,829 A 8/1959 Arrington et al.
3,026,182 A * 3/1962 Jankowski ............ G01N 31/16
436/51

(Continued)

FOREIGN PATENT DOCUMENTS

JP 55-74453 * 6/1980

OTHER PUBLICATIONS

Sweileh, J. A. et al, Review of Scientific Instruments 1988, 59, 2609-2615.*

*Primary Examiner* — Arlen Soderquist
(74) *Attorney, Agent, or Firm* — Quarles & Brady LLP

(57) ABSTRACT

A titration system is disclosed for determining content of an analyte in a sample. The titration system comprises: a controller; a reaction vessel; a titration vessel and an indicator vessel in fluid communication with the reaction vessel; a spectroscopy unit; a sensor for outputting a signal to the controller based on a force exerted by the reaction vessel on the sensor. The controller executes a stored program to: (i) perform titration by delivering to the reaction vessel a first mass of a first fluid comprising the sample, a second mass of a second fluid comprising indicator, and a third mass of a third fluid comprising titrant; (ii) detect color change in the mixture in the reaction vessel based on a signal from the spectroscopy unit and stop titration; and (iii) calculate content of the analyte in the sample based on the first mass, the second mass, and the third mass.

20 Claims, 5 Drawing Sheets

(56) References Cited

U.S. PATENT DOCUMENTS

| | | | | |
|---|---|---|---|---|
| 3,030,280 A | * | 4/1962 | Miller | G01N 27/44 205/787 |
| 3,447,906 A | * | 6/1969 | Zimmerli | G01N 31/16 422/75 |
| 3,459,506 A | * | 8/1969 | Finucane | G01N 33/362 436/139 |
| 3,462,244 A | * | 8/1969 | Leisey | G01N 33/2864 436/77 |
| 3,481,509 A | * | 12/1969 | Marhauer | G05D 7/0623 222/1 |
| 3,481,707 A | * | 12/1969 | Ernst | G01N 31/16 422/75 |
| 4,025,311 A | * | 5/1977 | Bochinski | G01N 35/00 422/67 |
| 4,165,218 A | * | 8/1979 | Vanhumbeeck | C25D 21/14 436/51 |
| 4,476,095 A | * | 10/1984 | Scott | G01N 21/79 250/361 R |
| 4,789,014 A | * | 12/1988 | DiGianfilippo | A61J 3/002 141/1 |
| 4,836,420 A | | 6/1989 | Kromrey | |
| 4,865,992 A | * | 9/1989 | Hach | G01N 21/83 436/51 |
| 4,920,056 A | * | 4/1990 | Dasgupta | G01N 35/08 422/130 |
| 4,950,610 A | * | 8/1990 | Tittle | G01N 21/79 356/229 |
| 5,007,560 A | * | 4/1991 | Sassak | B67D 1/04 222/1 |
| 5,029,658 A | * | 7/1991 | Martucci | G01G 23/3707 177/25.14 |
| 5,047,164 A | | 9/1991 | Corby | |
| 5,064,561 A | | 11/1991 | Rouillard | |
| 5,186,895 A | * | 2/1993 | Onofusa | G01N 1/28 204/405 |
| 5,192,509 A | * | 3/1993 | Surjaatmadja | G01N 1/38 422/75 |
| 5,282,889 A | | 2/1994 | Franklin | |
| 5,348,058 A | | 9/1994 | Ruhl | |
| 5,389,546 A | * | 2/1995 | Becket | G01N 31/164 436/51 |
| 5,405,452 A | | 4/1995 | Anderson et al. | |
| 5,427,126 A | | 6/1995 | Carney et al. | |
| 5,533,552 A | | 7/1996 | Ahlers | |
| 5,601,784 A | * | 2/1997 | Glover | C04B 11/264 210/143 |
| 5,721,143 A | * | 2/1998 | Smith | G01N 31/162 422/75 |
| 5,851,970 A | * | 12/1998 | Saito | C11D 3/33 510/187 |
| 5,888,311 A | | 3/1999 | Laufenberg et al. | |
| 6,017,356 A | | 1/2000 | Frederick et al. | |
| 6,089,242 A | | 7/2000 | Buck | |
| 6,136,362 A | | 10/2000 | Ashton | |
| 6,161,558 A | | 12/2000 | Franks et al. | |
| 6,372,505 B1 | * | 4/2002 | Aichert | G01N 31/16 422/75 |
| 6,391,122 B1 | | 5/2002 | Votteler et al. | |
| 6,423,675 B1 | | 7/2002 | Coughlin et al. | |
| 6,537,960 B1 | * | 3/2003 | Ruhr | C11D 1/83 510/195 |
| 8,980,636 B2 | | 3/2015 | Bolduc et al. | |
| 2002/0148485 A1 | * | 10/2002 | Taft | B08B 3/00 134/18 |
| 2002/0151080 A1 | | 11/2002 | Dasgupta et al. | |
| 2003/0175983 A1 | * | 9/2003 | Wei | G01N 21/79 436/163 |
| 2004/0023405 A1 | | 2/2004 | Bevan et al. | |
| 2004/0048329 A1 | * | 3/2004 | Beuermann | G01N 21/75 435/28 |
| 2004/0118432 A1 | * | 6/2004 | Kenowski | B08B 9/0325 134/18 |
| 2004/0166136 A1 | * | 8/2004 | Morelli | C11D 3/3956 424/405 |
| 2004/0245284 A1 | * | 12/2004 | Mehus | B01F 15/00123 222/77 |
| 2005/0017728 A1 | * | 1/2005 | Kaiser | G01N 27/221 324/453 |
| 2006/0016701 A1 | * | 1/2006 | Qin | G01N 27/3335 205/792 |
| 2006/0196529 A1 | * | 9/2006 | Kenowski | B08B 9/0325 134/56 R |
| 2008/0003140 A1 | * | 1/2008 | Di | G01N 35/1002 422/68.1 |
| 2008/0019873 A1 | * | 1/2008 | Shah | G01N 1/405 422/68.1 |
| 2008/0247265 A1 | * | 10/2008 | Wilcox | B01F 3/0803 366/152.2 |
| 2008/0314409 A1 | * | 12/2008 | Theyssen | B08B 3/00 134/18 |
| 2009/0275144 A1 | * | 11/2009 | Petersson | G01N 21/0303 436/163 |
| 2009/0285721 A1 | * | 11/2009 | DeGreeve | G01N 21/03 422/82.09 |
| 2010/0035356 A1 | * | 2/2010 | Shalyt | C23C 18/1683 436/163 |
| 2010/0181210 A1 | * | 7/2010 | Qin | G01N 27/3335 205/777.5 |
| 2010/0210026 A1 | * | 8/2010 | Hintz | G01N 31/16 436/147 |
| 2011/0105376 A1 | * | 5/2011 | England | C11D 3/386 510/226 |
| 2011/0159539 A1 | * | 6/2011 | Eisenkraetzer | C12N 5/0018 435/69.4 |
| 2011/0197920 A1 | | 8/2011 | Kenowski et al. | |
| 2011/0284090 A1 | * | 11/2011 | Popa | B01F 15/0022 137/2 |
| 2012/0028364 A1 | * | 2/2012 | Kraus | G01N 35/1095 436/127 |
| 2012/0103076 A1 | * | 5/2012 | Schwarz | G01N 31/16 73/61.59 |
| 2013/0233352 A1 | * | 9/2013 | Gattermeyer | B08B 3/00 134/18 |
| 2014/0227791 A1 | * | 8/2014 | Walter | G01N 35/00732 436/8 |
| 2014/0261870 A1 | * | 9/2014 | Olson | B01F 13/1055 141/9 |
| 2014/0273244 A1 | * | 9/2014 | Bolduc | G01N 21/79 436/51 |
| 2015/0024509 A1 | * | 1/2015 | Toumazou | G01N 27/4148 436/163 |
| 2015/0056710 A1 | * | 2/2015 | Reed | G01N 15/0211 436/86 |
| 2016/0071265 A1 | * | 3/2016 | Sandmann | G01G 23/37 348/61 |
| 2016/0077014 A1 | * | 3/2016 | Kraus | G01N 21/79 436/163 |
| 2017/0064949 A1 | * | 3/2017 | Kraus | A01N 37/36 |
| 2017/0138917 A1 | | 5/2017 | DeGrandpre et al. | |
| 2017/0158537 A1 | * | 6/2017 | Buschmann | C02F 9/00 |
| 2017/0159237 A1 | * | 6/2017 | Buschmann | C02F 9/00 |
| 2018/0031524 A1 | * | 2/2018 | Hassell, Jr. | G01N 29/024 |
| 2019/0055508 A1 | * | 2/2019 | Mohindra | B01D 15/362 |

\* cited by examiner

AUTOMATIC TITRATION DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a titration system and method for controlling, monitoring, and determining an analyte content for a clean-in-place system or similar automated washer.

2. Description of the Related Art

Food processing equipment, such as that found in dairies, typically includes, tanks, pumps, valves, and fluid piping. This food processing equipment often needs to be cleaned between each lot of product processed through the equipment. However, the tanks, pumps, valves, and piping can be difficult to clean because the various components may be difficult to access and disassemble for cleaning. Because of these cleaning difficulties, many food processing plants now use clean-in-place systems in which the tanks, pumps, valves, and piping of the food processing equipment remain physically assembled, and various cleaning, disinfecting, and rinsing solutions are circulated by the clean-in-place system through the food processing equipment to effect the cleaning process.

An example clean-in-place cleaning cycle normally begins with a pre-rinse cycle wherein water is pumped through the food processing equipment for the purpose of removing loose soil in the system. Typically, an alkaline wash would then be recirculated through the food processing equipment. This alkaline wash would chemically react with the soils of the food processing equipment to further remove soil. A third step would again rinse the food processing equipment with water, prior to a fourth step wherein an acid rinse would be circulated through the batch processing system. The acid rinse would neutralize and remove residual alkaline cleaner and remove any mineral deposits left by the water. Finally, a post-rinse cycle would be performed, typically using water and/or a sanitizing rinse. Such clean-in-place systems (and associated cleaning compositions) are known in the art, and examples can be found in U.S. Pat. Nos. 6,423,675, 6,391,122, 6,161,558, 6,136,362, 6,089,242, 6,071,356, 5,888,311, 5,533,552, 5,427,126, 5,405,452, 5,348,058, 5,282,889, 5,064,561, 5,047,164, 4,836,420, and 2,897,829.

Devices for the automatic dispensing of cleaning, rinsing, and/or sanitizing chemicals to the chemical reservoirs of a clean-in-place system or similar automated washer are also known. Typically, conductivity probes are used in combination with a controller to determine how much solution (i.e. pre-rinse, alkaline, acid, sanitizing) should be delivered to the food processing equipment during cleaning. Conductivity probes function by measuring the electrical conductivity of the water within the tank of interest. Because detergents are an alkali or an acid, the conductivity of the water varies with the detergent concentration. Therefore, by sensing the water conductivity, the controller is able to determine how much detergent is needed at various stages of the cleaning process.

However, conductivity probes have several limitations for clean-in-place systems. For example, conductivity probes can become fouled over time by chemical build-up thereby providing false conductivity measurements of the water. Additionally, not all cleaning products significantly contribute to the conductivity of the water and cannot be accurately measured using a conductivity probe. Conductivity also depends on several variables such as chemical composition, concentration, mobility of ions, valence of ions, and temperature. Failure to provide accurate conductivity measurements leads to the overuse of cleaning chemicals, and can increase manufacturing costs of the chemical plant.

Currently, there is a need for a device and methods for controlling and determining the concentration of an analyte in a clean-in-place system to avoid the overuse of cleaning chemicals, to ensure that all systems are properly cleaned, and to provide a tool to optimize the delivery of detergents to clean in place systems.

SUMMARY OF THE INVENTION

The present invention addresses the aforementioned drawbacks by providing a titration system and method for determine the concentration of an analyte in a sample. The titration system may be used to monitor the concentration of an analyte within a clean-in-place system. The titration system may, for example, use a load cell to measure the mass of a mixture during titration. The load cell may provide less systematic error and higher precision when compared with previous volumetric titration methods. The titration system may also include a self-cleaning feature that reduces fouling within the titration system, and allows for reproducible measurements between titrations.

Some aspects of the disclosure provide a titration system for determining the content of an analyte in a sample. The titration system comprises a controller, a reaction vessel for containing the sample comprising the analyte, a titration vessel and an indicator vessel in fluid communication with the reaction vessel, a spectroscopy unit and a sensor in electrical communication with the controller. The spectroscopy unit may include a radiation source and a receiver positioned adjacent to the reaction vessel to detect a color change in a mixture in the reaction vessel. The sensor can be positioned adjacent to the reaction vessel and output a signal to the controller based on a force exerted by the reaction vessel in a direction toward the sensor. The controller can be configured to execute a stored program in the controller to perform titration by delivering a first mass of a first fluid comprising the sample to the reaction vessel, delivering a second mass of a second fluid comprising an indicator to the reaction vessel, and delivering a third mass of a third fluid comprising a titrant to the reaction vessel to create the mixture. The controller can further be programmed to detect the color change in the mixture in the reaction vessel based on a signal received from the spectroscopy unit and to stop titration, and to calculate a content of the analyte in the sample based on the first mass, the second mass, and the third mass.

In other aspects, the titration system comprises a sample vessel in fluid communication with a needle to deliver the sample to the reaction vessel dropwise during the titration. In some aspects, the sample vessel is in fluid communication with a cleaning system where the sample vessel receives the sample from the cleaning system.

In some aspects, the indicator vessel and the titration vessel are further in fluid communication with a gas supply unit to pressurize the titration vessel and the indicator vessel to a pressure. The pressure can be between 1 and 5 psi.

In other aspects, the gas supply unit is in fluid communication with the reaction vessel to deliver a gas through the mixture during titration.

In some aspects, the sensor is a load cell.

In other aspects, the sample comprises an alkaline solution, a non-alkaline solution, a titratable halogen solution, an acidic solution, a conveyor lubricant, a sanitizing solution, or a hydrogen peroxide solution. The titratable halogen solution can be selected from the group consisting of a titratable chlorine solution, titratable iodine solution, and a titratable chlorine dioxide solution.

In some aspects, the titrant comprises sodium thiosulfate, an acid, a base, sodium lauryl sulfate, and copper sulfate. The acid may comprise hydrochloric acid, sulfuric acid, phosphoric acid or mixtures thereof. The base may comprise sodium hydroxide.

In other aspects, the indicator comprises phenolphthalein, potassium iodine, starch indicator, bromophenol blue, quaternary ammonium indicator, ferroin indicator, 1-(2-pyridylazo)-2-naphthol (PAN) indicator, thymol blue, or ammonium molybdate.

In some aspects, the analyte comprises hydroxide ions, hydrogen ions, chlorine, iodine, peroxyacetic acid, a chelant, hydrogen peroxide, conveyor lubricant, and quaternary ammonium compounds.

Other aspects of the present disclosure provide a titration system comprising a controller, a reaction vessel, a titration vessel, an indicator vessel, a sensor, and a spectroscopy unit. The titration vessel is in fluid communication with a titration valve. The titration valve is in fluid communication with the reaction vessel and is moveable between an open position in which titrant can be delivered from the titration vessel to the reaction vessel and a closed position in which the titrant is blocked from entering the reaction vessel from the titration vessel. The titration valve is in electrical communication with the controller. The indicator vessel is in fluid communication with an indicator valve. The indicator valve is in fluid communication with the reaction vessel and is moveable between an open position in which indicator can be delivered from the indicator vessel to the reaction vessel and a closed position in which indicator is blocked from entering the reaction vessel from the indicator vessel. The indicator valve is in electrical communication with the controller. The sensor can be positioned adjacent to the reaction vessel where the sensor outputs signals to the controller based on a mass of a fluid contained in the reaction vessel. The spectroscopy unit can include a radiation source and a receiver positioned adjacent to the reaction vessel. The spectroscopy unit can be configured to detect a color change of the fluid in the reaction vessel. The spectroscopy unit is in electrical communication with the controller. The controller is configured to execute a program stored in the controller to receive a first signal from the sensor, and calculate a first mass of a first fluid in the reaction vessel where the first fluid comprises a sample. The controller can be further programmed to move the indicator valve from the closed position to the open position to deliver indicator from the indicator vessel to the reaction vessel, move the indicator valve to the closed position, receive a second signal from the sensor, and calculate a second mass of a second fluid in the reaction vessel. The second fluid comprising the sample and the indicator is delivered to the reaction vessel. The controller can be further programmed to move the titration valve from the closed position to the open position to deliver titrant from the titration vessel to the reaction vessel, move the titration valve from to the closed position when a color change is detected based on a third signal received from the spectroscopy unit, and to calculate a third mass of a third fluid in the reaction vessel, the third fluid comprising the sample and the indicator delivered to the reaction vessel and the titrant delivered to the reaction vessel. The controller can be further programmed to calculate a concentration of an analyte in the sample based on the first mass, the second mass, and the third mass.

In some aspects, the gas supply unit is further in fluid communication with the reaction vessel to inject a gas into fluid in the reaction vessel.

In other aspects, the titration valve, the indicator valve, and the reaction valve each comprise a pinch valve.

In some aspects, the reaction vessel is in fluid communication with a reaction valve, the reaction valve is in fluid communication with a source of the first fluid, the reaction valve is moveable between an open position in which the first fluid is delivered to the reaction vessel and a closed position in which the first fluid is blocked from entering the reaction vessel, and the reaction valve is in electrical communication with the controller.

In other aspects, the titration system includes a hollow needle in fluid communication with the titration valve, wherein the needle separates the titrant delivered to the reaction vessel into droplets for delivery to the second fluid.

In some aspects, the titration system includes one or more additional titration vessels. Each additional titration vessel is in fluid communication with an associated titration valve, and each associated titration valve is in fluid communication with the reaction vessel. Each associated titration valve is moveable between an open position in which titrant can be delivered from its associated titration vessel to the reaction vessel and a closed position in which titrant is blocked from entering the reaction vessel from the titration vessel. Each associated titration valve is in electrical communication with the controller.

In other aspects, the titration system includes one or more additional indicator vessels. Each additional indicator vessel is in fluid communication with an associated indicator valve, and each associated indicator valve is in fluid communication with the reaction vessel. Each associated indicator valve is moveable between an open position in which indicator can be delivered from its associated indicator vessel to the reaction vessel and a closed position in which indicator is blocked from entering the reaction vessel from the indicator vessel. Each associated indicator valve is in electrical communication with the controller.

In some aspects, the reaction vessel is in fluid communication with a cleaning system, and the reaction vessel receives the sample from the cleaning system.

In other aspects, the cleaning system comprises a clean-in-place system, a waste treatment system, a membrane, or a sanitizer.

In some aspects, the cleaning system comprises a storage tank for containing a chemical and further comprises a pump for delivering the chemical to the storage tank wherein the controller is in electrical communication with the pump, and the controller is configured to execute the program stored in the controller to turn on the pump to deliver the chemical to the storage tank based on the concentration of the analyte in the sample.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

Like reference numerals will be used to refer to like parts from Figure to Figure in the following description of the drawings.

DESCRIPTION OF THE INVENTION

Figure 1:
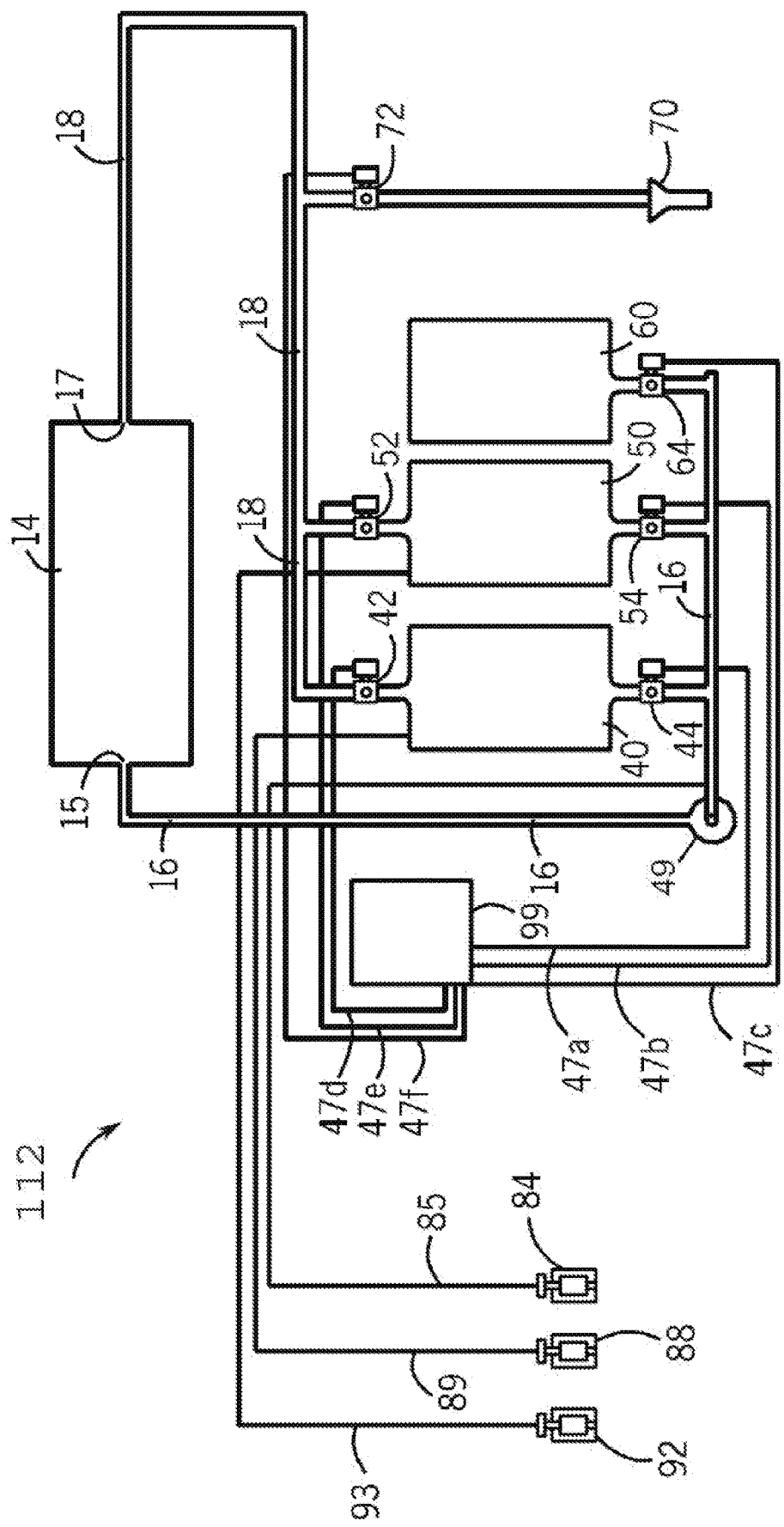
FIG. 1 is a schematic of a conventional clean-in-place system.

In order to provide background for the present invention, the arrangement and operation of one version of a conventional clean-in-place system will be described with reference to FIG. 1. The clean-in-place system, indicated generally at 112, is used to clean an apparatus, indicated generally at 14. The apparatus 14 may be, for example, food processing equipment, such as that found in dairies, breweries, and carbonated beverage plants, which typically includes tanks, pumps, valves, and fluid piping. The apparatus 14 to be cleaned by the clean-in-place system 112 is not limited to this type of equipment but may be any apparatus that can be cleaned by moving fluids through the apparatus.

The clean-in-place system 112 includes an alkaline tank 40, and acid tank 50, and a rinse tank 60. The alkaline tank 40 typically contains an alkaline cleaning solution used in the clean-in-place process, and suitable alkaline cleaning solutions are well known and commercially available. The acid tank 50 typically contains an acidic cleaning solution used in the clean-in-place process, and suitable acidic cleaning solutions are well known and commercially available. The rinse tank 60 contains a rinsing composition used in the clean-in-place process. In many clean-in-place systems the rinsing composition is water.

The alkaline tank 40, the acid tank 50, and the rinse tank 60 are placed in fluid communication in the clean-in-place system 112 and with the apparatus 14 by way of various conduits and valves. The clean-in-place system 112 includes a fluid supply conduit 16 that is connected to an inlet 15 of the apparatus 14. The fluid supply conduit 16 of the clean-in-place system 112 is also connected to the alkaline tank 40, the acid tank 50 and the rinse tank 60 through an alkaline supply valve 44, an acid supply valve 54, and a rinse supply valve 64, respectively. A pump 49 is configured in the conduit 16 to deliver fluid from the alkaline tank 40, the acid tank 50, and the rinse tank 60 to the apparatus 14. The fluid supply conduit 16 of the clean-in-place system 112 is also connected to a sanitizer pump 84 by way of a sanitizer conduit 85. The sanitizer pump 84 provides a sanitizing composition to the fluid supply conduit 16 as described below.

The clean-in-place system 112 also includes a fluid return conduit 18 that is connected to an outlet 17 of the apparatus 14. The fluid return conduit 18 of the clean-in-place system 112 is also connected to the alkaline tank 40 and the acid tank 50 through an alkaline return valve 42 and an acid return valve 52, respectively. The fluid return conduit 18 of the clean-in-place system 112 is also connected to a clean-in-place drain 70. A drain valve 72 is provided to control fluid flow from the fluid return conduit 18 of the clean-in-place system 112 to the drain 70.

The clean-in-place system 112 also includes an alkaline pump 88 that provides alkaline cleaning solution to the alkaline tank 40 by way of an alkaline conduit 89. An acid pump 92 is also provided to pump acidic cleaning solution to the acid tank 50 by way of an acid conduit 93. The valves of the clean-in-place system 112 are actuated using compressed air by way of control signals provided by lines 47a, 47b, 47c, 47d, 47e, and 47f to the valves from a programmable logic controller (PLC) 99. Such programmable logic controllers are commercially available from Rockwell Automation, Milwaukee, Wis.

Having described the construction of the clean-in-place system 112, the operation of the clean-in-place system 112 can now be described. After the apparatus 14 has completed one or more processes (such as a batch fluid packaging process), the clean-in-place system 112 is activated to clean and/or disinfect the apparatus 14. In a first step of the clean-in-place process, often termed the "first rinse" step, the rinse supply valve 64 is opened and the drain valve 72 is opened to allow rinse water (and often some suspended or dissolved solids) to be pushed from the apparatus 14 into the drain 70 by way of rinse water. In a next step called a "rinse push", the alkaline supply valve 44 is opened, the alkaline return valve 42 remains closed, and the drain valve 72 remains open, thereby pushing further amounts of the rinse water into the drain 70 by way of the alkaline cleaning solution from the alkaline tank 40.

In a following "alkaline wash" step, the alkaline supply valve 44 remains open, the alkaline return valve 42 is opened, and the drain valve 72 is closed such that the alkaline cleaning solution is circulated and recirculated through the clean-in-place system 112 and the apparatus 14. Various compositions are suitable as the alkaline cleaning solution, and typically these alkaline solutions react with fatty acids in organic soils in the apparatus 14 to produce a salt by way of an acid-base reaction.

In a next step called "alkaline rinse push", the rinse supply valve 64 is opened, the alkaline return valve 42 remains open, and the alkaline supply valve 44 is closed, thereby pushing the alkaline cleaning solution in the clean-in-place system 112 and the apparatus 14 into the alkaline tank 40. In a subsequent step called "alkaline rinse", the rinse supply valve 64 remains open, and the drain valve 72 is opened, thereby sending rinse water (and suspended or dissolved solids) to the drain 70. In a following step called "rinse push", the rinse supply valve 64 is closed, the acid supply valve 54 is opened, the acid return valve 52 remains closed and the drain valve 72 remains open, thereby pushing further rinse water (and suspended or dissolved solids) to drain 70.

In a following "acid wash" step, the acid supply valve 54 remains open, the acid return valve 52 is opened, and the drain valve 72 is closed such that acidic cleaning solution is circulated and recirculated through the clean-in-place system 112 and the apparatus 14. Various compositions are suitable as the acidic cleaning solution, and typically these acidic solutions react with basic materials (e.g. minerals) in the apparatus 14 to produce a salt by way of an acid-base reaction.

In a next step called "acid rinse push", the rinse supply valve 64 is opened, the acid return valve 52 remains open, and the acid supply valve 54 is closed, thereby pushing the acidic cleaning solution in the clean-in-place system 112 and the apparatus 14 into the acid tank 50. In a following step called "acid rinse", the rinse supply valve 64 remains open, the acid return valve 52 is closed, and the drain valve 72 is opened, thereby sending rise water (and suspended or dissolved solids) to the drain 70.

In a following step called "sanitize", the rinse supply valve 64 remains open, the drain valve 72 remains open, and the PLC 99 initiates delivery of sanitizer from the sanitizer pump 84 by way of the sanitizer conduit 85 to the fluid supply conduit 16. The rinse water including the injected sanitizer is circulated through the clean-in-place system 112 and the apparatus 14, and is sent to drain 70. In a next step called "sanitizer push", sanitizer injection is stopped, the rinse supply valve 64 remains open and the drain valve 72 remains open thereby pushing the remaining sanitizer/water mixture to drain 70. The clean-in-place process is then complete.

It should be understood that the arrangement and operation of the clean-in-place system of FIG. 1 have been described for background context for the present invention. Numerous modifications of the clean-in-place system of FIG. 1 are possible. Several non-limiting examples of modifications of the clean-in-place system of FIG. 1 include (1) a clean-in-place system having either an alkaline tank 40 or an acid tank 50; and (2) the clean-in-place system of FIG. 1 wherein various fluid "pushing" processes (e.g. "alkaline rinse push" or "acid rinse push") are executed by way of air from the air source rather than liquids from the alkaline tank 40, the acid tank 50, and/or the rinse tank 60.

Having described the construction and operation of the conventional clean-in-place system 112 shown in FIG. 1, some drawbacks and disadvantages of such a conventional clean-in-place system can be highlighted. Typically, devices are provided in such clean-in-place systems for the automatic dispensing of alkaline and acid chemicals to the alkaline tank and the acid tank of the clean-in-place system to provide for more efficient use of cleaning chemicals. For instance, the overuse of a cleaning chemical can be avoided by measuring the concentration of a cleaning chemical in the alkaline or acid tank prior to delivery to the apparatus. However, conventional methods such as using a conductivity probe can become fouled over time by chemical build-up thereby providing false indications of the water conductivity. Also, conductivity probes can fail thereby providing no indication of the water conductivity. Systems with fouled or nonfunctioning probes lead to overuse of a cleaning chemical.

Other methods for determining the cleaning chemical concentration include sampling a tank of interest and manually titrating the sample. Titration can be a tedious, time-consuming process requiring careful practice by a chemist or a skilled operator. In attempts to reduce turn-around cleaning time, titrations are often performed in the field using a pipette or an eye dropper. Eye droppers often introduce systematic error when calculating the cleaning chemical concentration due to variable drop sizes during titration. Pipettes have higher precision, but are subject to over titration due to operator error (i.e., adding too much titrant past an indication). Both instances may lead to an overuse or an underuse of a cleaning chemical resulting in suboptimal plant operation.

Figure 2:
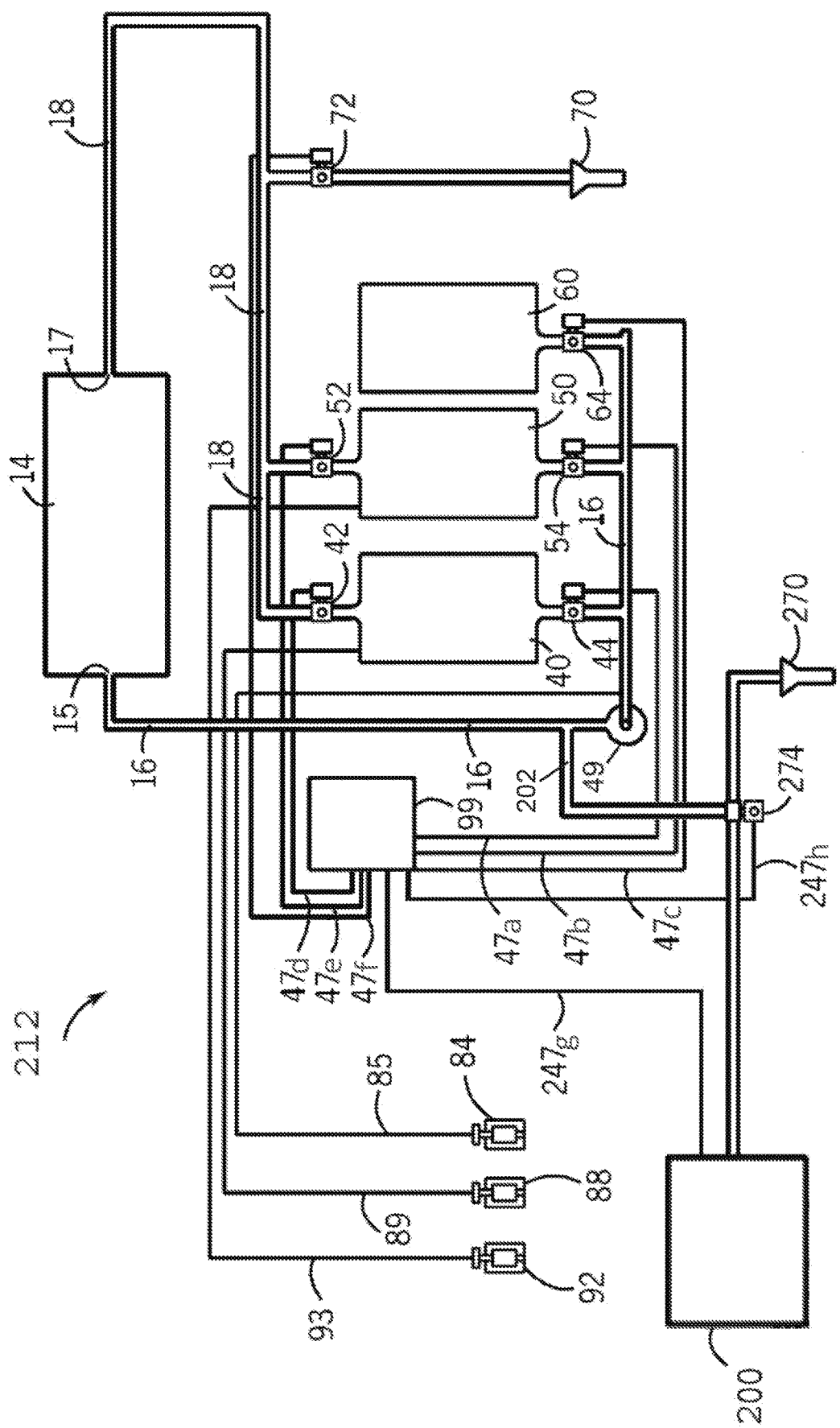
FIG. 2 is a schematic of a clean-in-place system including a titration system according to one embodiment of the present disclosure.

Referring now to FIG. 2, there is shown one solution to these problems. Specifically, a schematic of a clean-in-place system 212 according to one embodiment of the disclosure is shown. The clean-in-place system 212 of FIG. 2 includes many of the components of the clean-in-place system of FIG. 1. The clean-in-place system 212 of FIG. 2 includes an alkaline tank 40, an acid tank 50, a rinse tank 60, and an apparatus 14 in fluid communication with a titration system 200. The alkaline tank 40 contains an alkaline cleaning solution, the acid tank 50 contains an acid cleaning solution, and the rinse tank contains a rinsing composition.

Similar to above, a fluid supply conduit 16 places the alkaline tank 40, the acid tank 50, and the rinse tank 60 in fluid communication with the apparatus 14 in the clean-in-place system 212. Construction of the clean-in-place system 212 is similar to the clean-in-place system 112 of FIG. 1; however, the clean-in-place system 212 of FIG. 2 further includes a fluid sampling conduit 202 that places the fluid supply conduit 16 in fluid communication with a titration supply valve 274. The titration supply valve 274 is further in fluid communication with a drain 270 and the titration system 200. The titration supply valve 274 and the titration system 200 are placed in electrical communication with a programmable logic controller (PLC) 99 through lines 247$h$ and 247$g$, respectively. The PLC 99 controls the flow of fluid through the fluid sampling conduit 202 to the titration system 200 and from the titration system 200 to the drain 270 by moving the titration supply valve 274 between positions.

When the titration supply valve 274 is in a closed position, the clean-in-place system 212 operates in a substantially similar manner as the clean-in-place system 112 of FIG. 1. At any point during operation, the titration supply valve 274 may be moved to a first open position by the PLC 99 to deliver a cleaning solution to the titration system 200. The titration system 200 may then determine an analyte concentration from the cleaning solution. In some aspects, the programmable logic controller (PLC) 99 may then receive signals based on the analyte concentration from the titration system 200 to maintain proper levels of the analyte concentration within the clean-in-place system 212. The analyte may comprise a chemical species within the alkaline cleaning solution, the acidic cleaning solution, or the sanitizing solution. The titration supply valve 274 may also be moved to a second open position by the PLC 99 to deliver waste from the titration process of the titration system 200 to the drain 270.

Due to the recirculation of the cleaning solutions and rinsing steps, the concentration of the analyte in the cleaning solutions may decrease during operation and between cleaning cycles. In some aspects, the titration system 200 may be used to continuously or intermittently test the concentration of the analyte in the cleaning solution to ensure that the analyte is at an appropriate concentration to optimize cleaning efficiency. In the instance that the analyte concentration in the cleaning solution is too low, the PLC 99 may deliver more analyte to the clean-in-place system 212 from an analyte source. In some non-limiting examples, the PLC 99 may be connected to the acid pump 92, the alkaline pump 88, or the sanitizer pump 84 to deliver more acid, alkaline, or sanitizer cleaning solution to the clean-in-place system 212, respectively. In the instance that the analyte concentration is too high, the rinse supply valve 64 may be opened to dilute the concentration of the analyte in the cleaning solution with rinse water.

Figure 3:
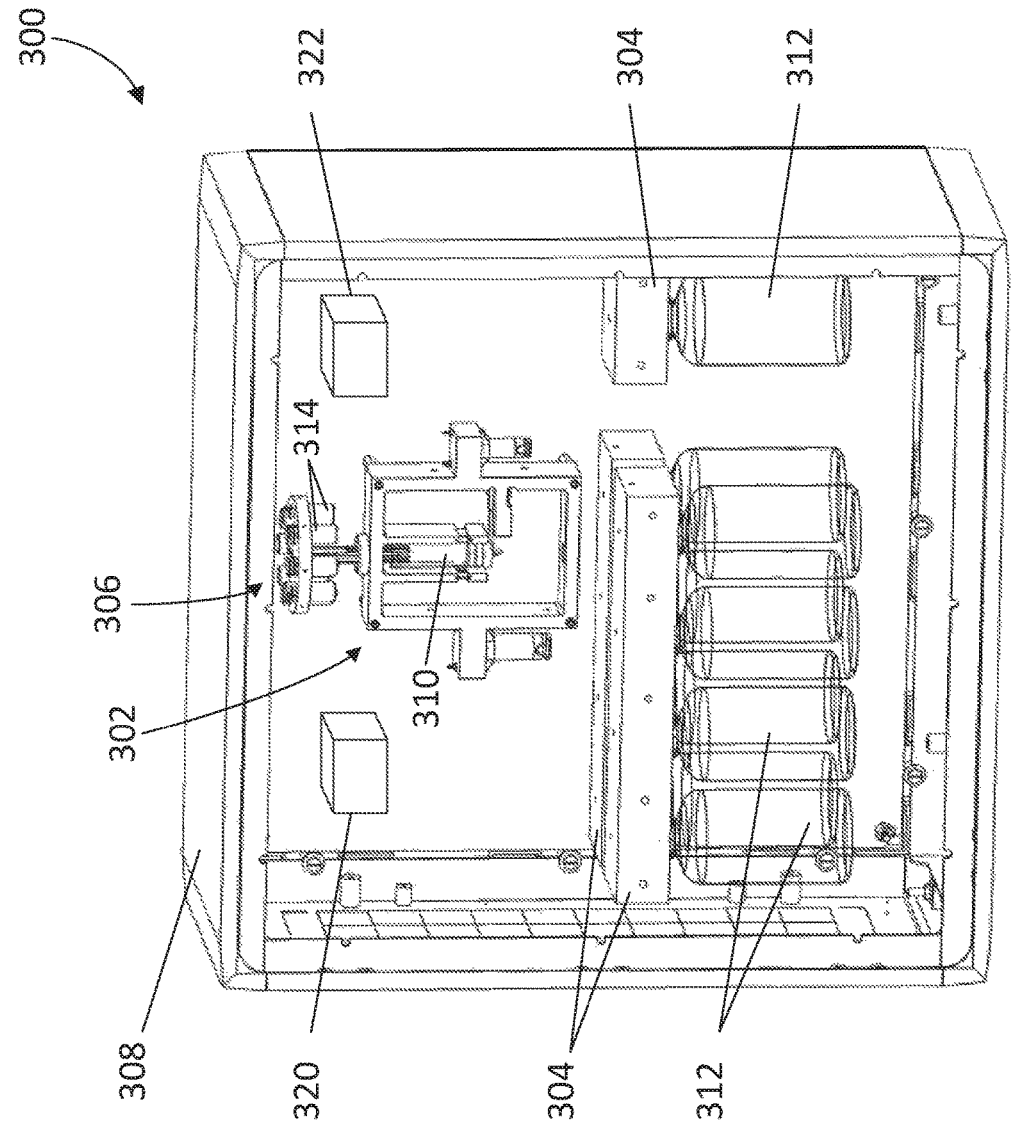
FIG. 3 is a titration system for determining content of an analyte in a clean-in-place system according to one embodiment of the present disclosure.
Figure 4:
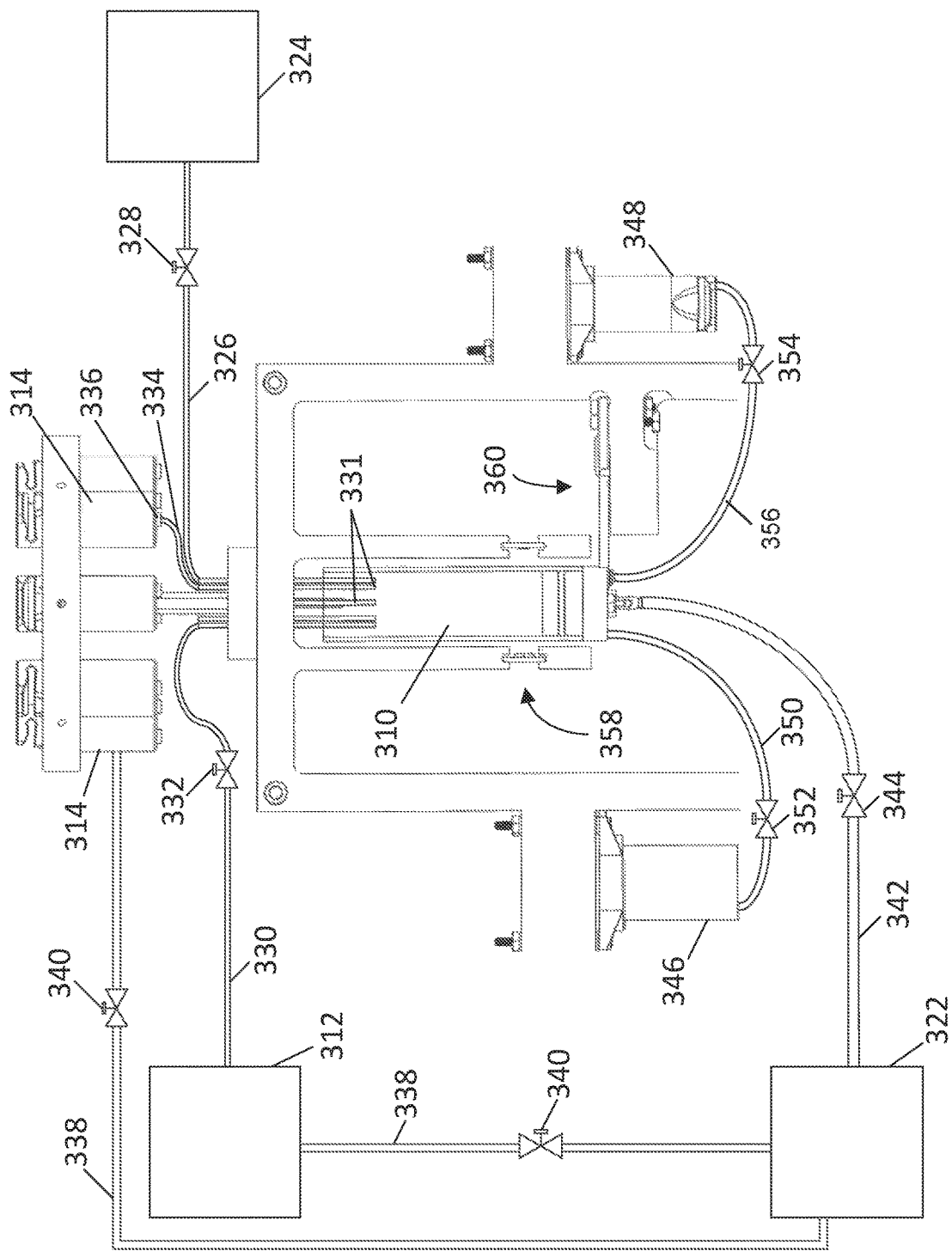
FIG. 4 is an enlarged view of a reaction vessel in fluid communication with a titration vessel, an indicator vessel, a clean-in-place system, a wash tank, and a drain of the titration system of FIG. 3.
Figure 5:
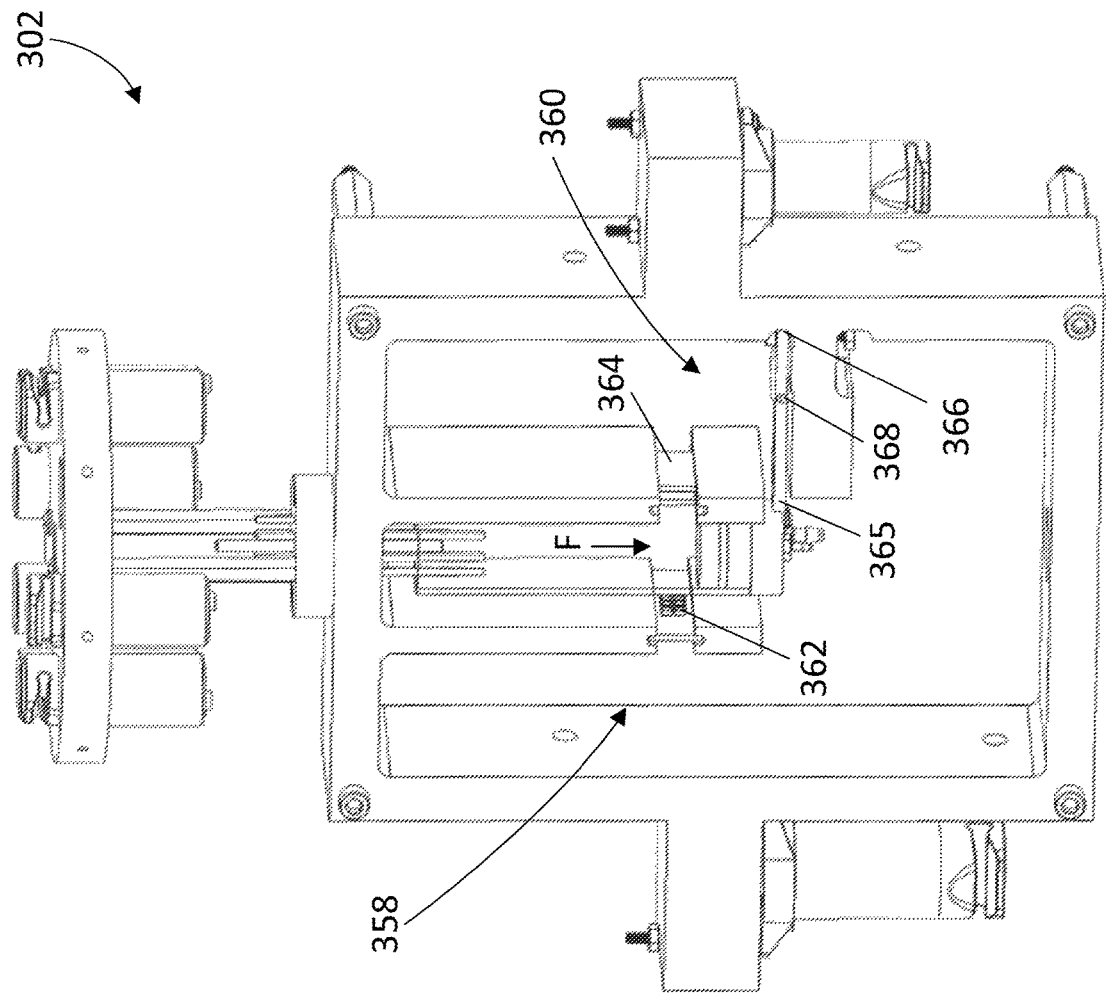
FIG. 5 is a perspective view of a titration assembly of the titration system of FIG. 3.

Referring to FIGS. 3 to 5, a titration system 300 for determining an analyte concentration in a sample is shown according to one embodiment of the disclosure. For clarity, fluid communication conduits and valves for the titration system 300 are not shown in FIG. 3, but will be detailed below. The titration system 300 includes a reaction vessel assembly 302, a titration manifold 304, and an indicator vessel assembly 306 configured within a housing 308.

The reaction vessel assembly 302 may include a reaction vessel 310 that is configured to receive and contain the sample. The titration manifold 304 may include one or more titrant vessels 312 that are configured to contain a titrant. Similarly, the indicator assembly 306 may be configured to support one or more indicator vessels 314, each configured to contain an indicator. The titration system 300 may also include a batch titration manifold configured to support a titration vessel 312, which may be configured to contain a reservoir of a batch sample. The titration system 300 may also contain a controller 320 and a gas supply unit 322.

FIG. 4 illustrates a simplified schematic to show the fluid communication lines within the titration system 300. The titration system 300 includes a sample conduit 326 that places the reaction vessel 310 in fluid communication with a sample valve 328 and a sample source 324. The sample valve 328 may be movable between an open position in which sample can be delivered from the sample source 324 to the reaction vessel 310, and a closed position in which the sample is blocked from entering the reaction vessel 310. In some aspects, the sample is transported from the sample source 324 to the reaction vessel 310 by a pump. The sample valve 328 may be in electrical communication with the controller 320 to control the positioning of the valve between the open and closed position.

A suitable sample source 324 for the titration system 300 may include any system or solution that comprises a titratable analyte. In some aspects, the sample source 324 may be a clean-in-place system, a waste treatment system, a membrane system, or a sanitizing system. In some non-limiting examples, the sample may comprise an alkaline solution, a non-alkaline solution, a titratable halogen solution, an acidic solution, a conveyor lubricant, a sanitizing solution, or a hydrogen peroxide solution. In some aspects, the titratable halogen solution may be a titratable chlorine solution, titratable iodine solution, and a titratable chlorine dioxide solution. In some non-limiting examples, a suitable analyte for the titration system may include hydroxide ions, hydrogen ions, chlorine, iodine, peroxyacetic acid, a chelant, hydrogen peroxide, conveyor lubricant, and quaternary ammonium compounds.

The titration system 300 also includes titration conduits 330 and indicator conduits 334 that place the reaction vessel 310 in fluid communication with the titration vessels 312 and the indicator vessels 314, respectively. An indicator valve 336 may be configured to the indicator conduit 334 and a titration valve 332 may be configured to the titration conduit 330 to control the flow of indicator and titrant to the reaction vessel 310, respectively. The indicator valve 336 and the titrant valve 332 may being movable between an open position and a closed position to regulate the flow of indicator and titrant to the reaction vessel 310. The indicator valve 336 and the titrant valve 332 are in electrical communication with the controller 320 to control the positioning of the valves. In some aspects, the titration valve 332 and the indicator valve 336 each comprise a pinch valve.

For simplicity, FIG. 4 only shows one indicator conduit 334 between the reaction vessel 310 and the indicator vessel 314. Similarly, only one titration conduit 330 is shown between the titration vessel 312 and the reaction vessel 310. However, it is to be appreciated that all of the indicator vessels 314 and the titration vessels 312 may be in fluid communication with the reaction vessel 310 through the use of multiple titration conduits 330 and indicator conduits 334. In some aspects, hollow needles 331 may place the titrant conduit 330, the indicator conduits 334, and the sample conduit 326 in fluid communication with the reaction vessel 310. The hollow needles 331 may assist in forming fluid droplets, which may improve delivering the titrant, indicator, or sample fluid to the reaction vessel 310 at a controllable rate during titration.

Suitable titrants for the titration system 300 may include acidic solutions, basic solutions, oxidizing agents, reducing agents, chelating agents, or similar titrants. In some non-limiting examples, the titrants may comprise hydrochloric acid, sulfuric acid, phosphoric acid, sodium hydroxide, sodium thiosulfate, sodium lauryl sulfate, and copper sulfate. Suitable indicators for the titration system 300 may include phenolphthalein, potassium iodine, starch indicator, bromophenol blue, quaternary ammonium indicator, ferroin indicator, 1-(2-pyridylazo)-2-naphthol (PAN) indicator, thymol blue, or ammonium molybdate.

The gas supply unit 322 that may be used to pressurize the titration vessels 312 and the indicator vessels 314 to a pressure. In some aspects, the pressure may be between 1 and 5 psi. In other aspects, any suitable pressure may be used that can transport the indicator or titrant to the reaction vessel 310 upon moving the indicator valve 336 or titrant valve 332 to the open position. Gas conduits 338 may be configured to place the gas supply unit 322 in fluid communication with the titration vessels 312 and the indicator vessels 314. The pressure of the titration vessels 312 and the indicator vessels 314 may be controlled by moving the position of the gas supply valves 340 between an open position and a closed position. The gas supply valves 340 may be in electrical communication with the controller 320 to control the position of the valve.

In some aspects, the titration system 300 may include a mixing conduit 342 that places the reaction vessel 310 in fluid communication with the gas supply unit 322. A mixing valve 344 may be used to control the flow rate of gas delivered to the reaction vessel 310. In some aspects, the mixing conduit 342 is in fluid communication with the reaction vessel 310 such that at least a portion of the gas from the gas supply unit 322 is transported through the sample in the reaction vessel 310.

The titration system 300 may also include a rinsing vessel 346 and a drain vessel 348. A rinsing conduit 350 may place the reaction vessel 310 in fluid communication with a rinsing valve 352 and the rinsing vessel 346. The rinsing valve 352 may be movable between an open position in which rinsing fluid can be delivered from the rinsing vessel 346 to the reaction vessel 310, and a closed position in which the rinsing fluid is blocked from entering the reaction vessel 310. The rinsing valve 352 may be in electrical communication with the controller 320 to control the positioning of the valve between the open and closed position. A drain conduit 356 may place the reaction vessel 310 in fluid communication with a drain valve 354 and the drain vessel 348. The drain valve 354 may be movable between an open position in which fluid from the reaction vessel 310 can be removed, and a closed position in which fluid from the reaction vessel 310 is blocked from entering the drain vessel 348.

Having described the fluid communication of the titration system 300, the construction of the reaction assembly 302 can now be described in greater detail. Looking at FIG. 5, the reaction assembly 302 includes a spectroscopy unit 358 and a sensor 360 positioned adjacent to the reaction vessel 310. The spectroscopy unit 358 includes a radiation source 362 and a receiver 364 that are configured to detect a color change in a mixture within the reaction vessel 310. The sensor 360 is configured to output a signal to the controller 320 based on a force (F) exerted by the reaction vessel 310 in a direction toward the sensor. In some aspects, the sensor 360 is a load cell configured to determine a mass of the mixture in the reaction vessel 310.

The spectroscopy unit 358 may be configured adjacent to the reaction vessel 310 such that the radiation source 362 emits radiation through a mixture within the reaction vessel 310 to the receiver 364. The receiver 364 being configured to detect a color change in the mixture and outputting a signal to the controller 320 based on the color change.

In some aspects, the sensor 360 includes a beam having a first end 366 attached to the reaction assembly 302 and a second end 365 configured to receive the force (F) exerted b the reaction vessel 310. In some aspects, the sensor 360 may include one or more strain gauges 368 that are attached to the beam to output a signal relating to a change in resistance based on the force (F) applied to reaction vessel 310, The signal generated from the sensor 360 may then be sent to the controller 320 to determine the mass of the mixture in the reaction vessel 310. In other aspects, the sensor 360 may comprise a torque sensor, a pressure sensor, a capacitive load cell, or the like.

In operation, the titration system 300 may be used to automatically titrate a sample to determine a concentration of an analyte. In some aspects, a first step of the titration system 300 may be to deliver a first mass of the sample from the sample source 324 to the reaction vessel 310 by opening the sample valve 328. The sample valve 328 may then be closed, and the controller 320 may receive a first signal from the sensor 360 to calculate the first mass. In some aspects, the sensor 360 may be used to continuously measure the first mass of the sample as it is delivered to the reaction vessel 310 where sample is delivered to the reaction vessel 310 until it reaches a pre-set mass. Once the pre-set mass has been reached, the sample valve 328 may be closed. In some non-limiting examples, the first mass of the sample can range from 0.01 to 50 grams. In other aspects, the first mass of the sample can range from 2 to 15 grams.

Following the addition of the sample, the indicator valve 336 may be moved from the closed position to the open position to deliver indicator from the indicator vessel 314 to the reaction vessel 310. The indicator valve 336 may then be closed, and the controller 320 may receive a second signal from the sensor 360 to calculate a second mass of the indicator. In some aspects, the sensor 360 may be used to continuously measure the second mass of the indicator as it is delivered to the reaction vessel 310 until it reaches a second pre-set mass. Once the second pre-set mass has been reached, the indicator valve 328 may be closed. The second mass may then be stored in a memory within the controller 320. In some aspects, the second mass of the indicator may be approximately equal to the mass of 1 to 15 drops of the indicator. In other aspects, the second mass of the indicator may be approximately equal to the mass of 3 to 10 drops of the indicator, or approximately equal to 3 to 5 drops of the indicator.

Next, the titration valve 332 may be moved from the closed position to the open position to deliver titrant from the titration vessel 312 to the reaction vessel 310. In some aspects, the titrant is delivered to the reaction vessel 310 at a dropwise rate. The titration valve 332 may be moved to the closed position when the controller 320 receives a third signal from the spectroscopy unit 358 based on a color change in the mixture. The controller 320 may then receive a fourth signal from the sensor 260 to calculate a third mass of the titrant. The controller 320 may then execute a program stored in the controller to calculate the concentration of the analyte based on the first mass, the second mass, and the third mass. In some aspects, using a sensor 360, such as a load cell, to measure the mass of the mixture during titration can improve the accuracy of determining the concentration of the analyte in the sample. For example, the relative uncertainty may be defined by Eqn. 1.

$$\text{Relative Uncertainty (\%)} = \left| \frac{\text{uncertainty}}{\text{measured quantity}} \right| * (100) \quad \text{(Eqn. 1)}$$

In some aspects, the load cell may have an uncertainty between 0.005 mg to 0.5 g, and may have a relative uncertainty (%) between 1% to 0.0001%. In other aspects, the relative uncertainty (%) may be between 0.4% to 0.0001%. This method offers improved precision when determining analyte concentration over other titration methods that rely on volumetric measurements (i.e. burette, pipette, pump).

In some aspects, gas may be transported from the gas supply unit 322 to the reaction vessel 310 by moving the gas supply valve 344 to the open position. The gas supply conduit 342 may be configured such that the gas is transported through at least a portion of the mixture in the reaction vessel 310 to provide mixing during titration. In some aspects, the gas may be delivered to the reaction vessel at a constant rate or intermittently. In one non-limiting example, the controller 320 may be configured to deliver gas to the reaction vessel 310 after each drop of titrant or indicator. In some aspects, mixing may improve the contact between the titrant and analyte by homogenizing the mixture, and may assist in preventing over titrating the mixture.

In some aspects, rinse water may be delivered to the reaction vessel 310 by moving the rinsing valve 352 to an open position. The rinse water may be used to clean the reaction vessel 310. In some aspects, gas may be transported through the rinse water from the gas supply unit 322 to assist in cleaning the reaction vessel. The rinsing valve 352 may then be moved to the closed position, and the drain valve 354 may be opened to remove the rinsing water from the reaction vessel 310. This process may be repeated multiple times to clean the reaction vessel 310, for example, 2 times, 3 times, 4 times, 5 times, 10 times, 20 times, etc. Unlike previous analyte measuring systems that are subject to inaccurate measurements due to fouling, such as measuring the analyte concentration using a conductivity probe, the titration system 300 has a self-cleaning capability that allows for consistent and accurate measurements of analyte concentrations.

In other aspects of the disclosure, titrant and indicator may be added to the reaction vessel 310 first, and then the sample may be used to titrate the titrant until a color change is detected by the spectroscopy unit 358.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A titration system for determining content of an analyte in a sample, the titration system comprising:
   a controller;
   a reaction assembly having a support structure that surrounds a reaction vessel, a spectroscopy unit, and a sensor,
      wherein the reaction vessel is configured to contain the sample comprising the analyte, the reaction vessel having a lower end and an upper end;
      wherein the spectroscopy unit is in electrical communication with the controller, the spectroscopy unit including a radiation source and a receiver positioned adjacent to the reaction vessel to detect a color change in a mixture in the reaction vessel;
      wherein the sensor is in electrical communication with the controller, the sensor comprising a beam having a first end attached to an interior wall of the support structure and a second end configured to receive the force exerted by the reaction vessel, wherein the beam includes one or more strain gauge, and wherein the sensor outputs a signal to the controller based on a force exerted by the reaction vessel in a direction toward the sensor;
   a titration vessel in fluid communication with the reaction vessel;
   an indicator vessel in fluid communication with the reaction vessel;
   a gas supply unit in fluid communication with the reaction vessel via a conduit, wherein the conduit is configured to dispense a gas from the gas supply unit to the lower end of the reaction vessel such that the gas is transported through the sample, and wherein the conduit dispenses the gas into the reaction vessel below the spectroscopy unit;
   a valve configured to control the flowrate of the gas from the gas supply unit to the reaction vessel; and
   wherein the controller is configured to execute a stored program in the controller to:
      (i) perform titration by delivering a first mass of a first fluid comprising the sample to the reaction vessel, delivering a second mass of a second fluid comprising an indicator to the reaction vessel, delivering a third mass of a third fluid comprising a titrant to the reaction vessel to create the mixture, and mix the mixture using the gas from the gas supply unit;
      (ii) detect the color change in the mixture in the reaction vessel based on a signal received from the spectroscopy unit and stopping titration; and
      (iii) calculate a content of the analyte in the sample based on the first mass, the second mass, and the third mass.

2. The titration system of claim 1, further comprising a sample vessel in fluid communication with a needle to deliver the sample to the reaction vessel dropwise during the titration.

3. The titration system of claim 2, wherein the sample vessel is in fluid communication with a cleaning system, the sample vessel receiving the sample from the cleaning system.

4. The titration system of claim 1, wherein the indicator vessel and the titration vessel are further in fluid communication with a gas supply unit to pressurize the titration vessel and the indicator vessel to a pressure.

5. The titration system of claim 4, wherein the gas supply unit is in fluid communication with the reaction vessel to deliver a gas through the mixture during titration.

6. The titration system of claim 1, wherein the reaction vessel includes the sample, and wherein the sample comprises an alkaline solution, a non-alkaline solution, a titratable halogen solution, an acidic solution, a conveyor lubricant, a sanitizing solution, or a hydrogen peroxide solution.

7. The titration system of claim 6, wherein the titratable halogen solution is selected from the group consisting of a titratable chlorine solution, titratable iodine solution, and a titratable chlorine dioxide solution.

8. The titration system of claim 6, wherein the titration vessel includes the titrant, and wherein the titrant is selected from the group consisting of sodium thiosulfate, an acid, a base, sodium lauryl sulfate, and copper sulfate.

9. The titration system of claim 8, wherein the acid comprises hydrochloric acid, sulfuric acid, phosphoric acid or mixtures thereof.

10. The titration system of claim 6, wherein the indicator vessel includes the indicator, wherein the indicator comprises phenolphthalein, potassium iodine, starch indicator, bromophenol blue, quaternary ammonium indicator, ferroin indicator, 1-(2-pyridylazo)-2-naphthol (PAN) indicator, thymol blue, or ammonium molybdate.

11. The titration system of claim 6, wherein the reaction vessel comprises the analyte, and wherein the analyte is selected from the group consisting of hydroxide ions, hydrogen ions, chlorine, iodine, peroxyacetic acid, a chelant, hydrogen peroxide, conveyor lubricant, and quaternary ammonium compounds.

12. The system of claim 1, wherein the reaction assembly further includes a first interior support wall coupled to the radiation source and a second interior support wall coupled to the receiver, wherein the first interior support wall and the second interior support wall extend from the support structure to position the radiation source and the receiver to be adjacent to the reaction vessel.

13. The system of claim 12, wherein the first interior support wall and the second interior support wall extend substantially parallel to an exterior wall of the reaction vessel.

14. The system of claim 1 further including a rinsing vessel in fluid communication with the reaction vessel, and wherein the rinsing vessel is coupled to the support structure.

15. The system of claim 1 further including a drain vessel in fluid communication with the reaction vessel, and wherein the drain vessel is coupled to the support structure.

16. A titration system comprising:
   a controller;
   a reaction assembly having a support structure that surrounds a reaction vessel, a spectroscopy unit, and a sensor,
      wherein the spectroscopy unit includes a radiation source and a receiver positioned adjacent to the reaction vessel, the spectroscopy unit configured to detect a color change of the fluid in the reaction vessel; the spectroscopy unit being in electrical communication with the controller;

wherein the sensor is in electrical communication with the controller, the sensor comprising a beam having a first end attached to an interior wall of the support structure and a second end configured to receive the force exerted by the reaction vessel, wherein the beam includes one or more strain gauge, and wherein the sensor outputs a signal to the controller based on a force exerted by the reaction vessel in a direction toward the sensor;

a titration vessel in fluid communication with a titration valve, the titration valve being in fluid communication with the reaction vessel, the titration valve being moveable between an open position in which titrant can be delivered from the titration vessel to the reaction vessel and a closed position in which the titrant is blocked from entering the reaction vessel from the titration vessel, the titration valve being in electrical communication with the controller;

an indicator vessel in fluid communication with an indicator valve, the indicator valve being in fluid communication with the reaction vessel, the indicator valve being moveable between an open position in which indicator can be delivered from the indicator vessel to the reaction vessel and a closed position in which indicator is blocked from entering the reaction vessel from the indicator vessel, the indicator valve being in electrical communication with the controller;

a gas supply unit in fluid communication with the reaction vessel via a gas conduit, wherein the gas conduit is configured to dispense a gas from the gas supply unit to the lower end of the reaction vessel such that the gas is transported through the sample, and wherein the gas conduit dispenses the gas into the reaction vessel below the spectroscopy unit;

a conduit that places the reaction vessel in fluid communication with a clean-in-place system, the reaction vessel receiving the sample from the clean-in-place system; and wherein the controller is configured to execute a program stored in the controller to:

(i) receive a first signal from the sensor, and calculate a first mass of a first fluid in the reaction vessel, the first fluid comprising a sample;

(ii) move the indicator valve from the closed position to the open position to deliver indicator from the indicator vessel to the reaction vessel, move the indicator valve to the closed position, receive a second signal from the sensor, and calculate a second mass of a second fluid in the reaction vessel, the second fluid comprising the sample and the indicator delivered to the reaction vessel;

(iii) move the titration valve from the closed position to the open position to deliver titrant from the titration vessel to the reaction vessel, move the titration valve from to the closed position when a color change is detected based on a third signal received from the spectroscopy unit, and calculate a third mass of a third fluid in the reaction vessel, the third fluid comprising the sample and the indicator delivered to the reaction vessel and the titrant delivered to the reaction vessel; and (iv) calculate a concentration of an analyte in the sample based on the first mass, the second mass, and the third mass.

17. The system of claim 16, further comprising a gas supply unit in fluid communication with the titration vessel to pressurize the titration vessel to a pressure.

18. The system of claim 17, wherein the gas supply unit is further in fluid communication with the reaction vessel to inject a gas into fluid in the reaction vessel.

19. The system of claim 16, wherein the titration valve, the indicator valve, and the reaction valve each comprise a pinch valve.

20. The system of claim 16, wherein the clean-in-place system comprises a storage tank for containing a chemical and further comprises a pump for delivering the chemical to the storage tank, the controller is in electrical communication with the pump, and the controller is configured to execute the program stored in the controller to:

(v) turn on the pump to deliver the chemical to the storage tank based on the concentration of the analyte in the sample.

* * * * *